J. GOODHEART.
Machine for Distributing Poison upon Plants.
No. 204,720. Patented June 11, 1878.
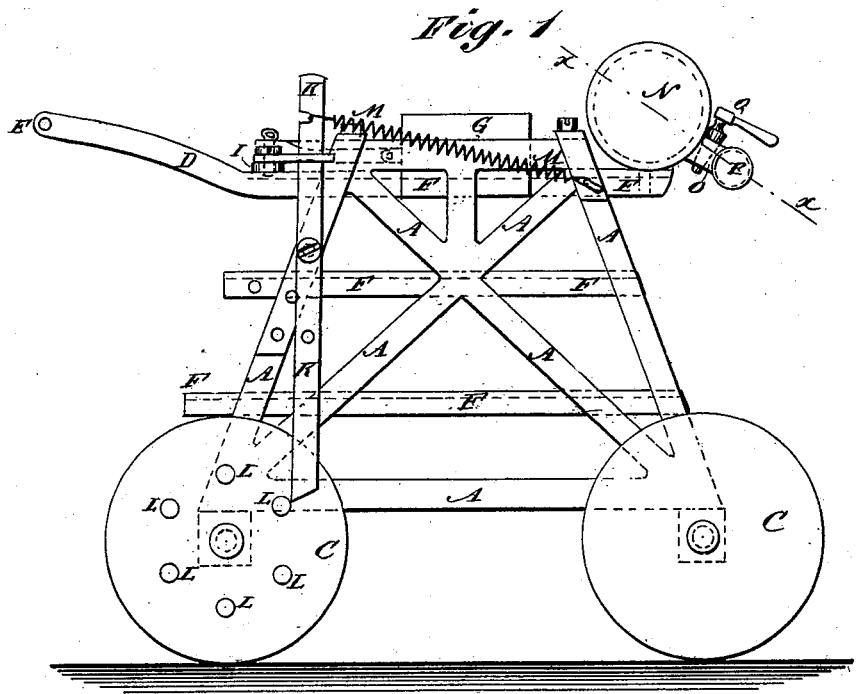
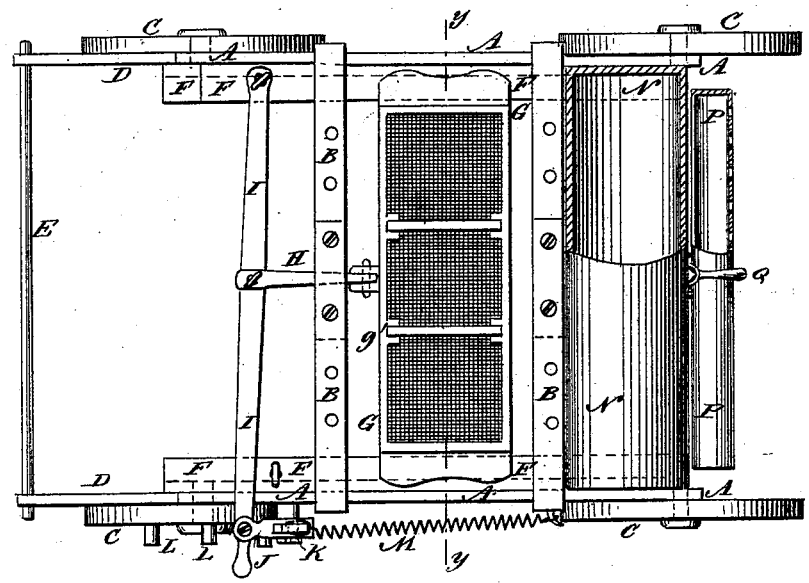
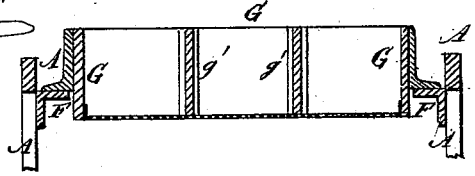
WITNESSES:
C. Neveux
C. Sedgwick
INVENTOR:
J. Goodheart
BY Munn & Co
ATTORNEYS.

UNITED STATES PATENT OFFICE.

JAMES GOODHEART, OF MATAWAN, NEW JERSEY.

IMPROVEMENT IN MACHINES FOR DISTRIBUTING POISON UPON PLANTS.

Specification forming part of Letters Patent No. 204,720, dated June 11, 1878; application filed May 2, 1878.

*To all whom it may concern:*

Be it known that I, JAMES GOODHEART, of Matawan, in the county of Monmouth and State of New Jersey, have invented a new and useful Improvement in Machines for Distributing Poison upon Potato-Plants, &c., of which the following is a specification:

Figure 1 is a side view of my improved machine. Fig. 2 is a top view of the same, partly in section, through the line $x\ x$, Fig. 1. Fig. 3 is a detail section taken through the line $y\ y$, Fig. 2.

Similar letters of reference indicate corresponding parts.

The object of this invention is to furnish an improved machine for distributing poison upon potato-plants to destroy the potato-bug, and which may also be used for sowing seeds, &c., which shall be simple in construction, reliable and convenient in use, and readily adjusted as may be required.

The invention will first be described in connection with the drawing, and then pointed out in the claim.

A are the side frames of my improved machine, to the upper corners of which are attached cross-bars B. The cross-bars B are each made in two parts, the inner ends of which overlap each other, and are secured in place by two bolts. Several sets of holes are made in the parts of the cross-bars B to receive the fastening-bolts, to enable the machine to be adjusted wider or narrower, as the width of the rows may require.

To the lower corners of the frames A are pivoted wheels C, upon which the said machine is moved from place to place.

To the rear corners of the frame A are attached arms D, which are connected by a round, E, to serve as a handle for guiding and propelling the machine.

To the inner sides of the frames A are attached longitudinal bars F to serve as ways for the screen-box G, the ends of which, or flanges formed upon said ends, rest and slide upon the said bars F. Several sets of bars F are attached to the frames A, so that the box G may be adjusted at any desired height that the size of the plants to be operated upon may require.

The bottom of the box G is formed of a fine screen, as shown in Figs. 2 and 3, and the said box may be divided into compartments by partitions $g'$, inserted in the grooves formed upon the inner side of the sides of the said box, so that the length of the box may be regulated as the size of the plants may require.

To the center of the rear side of the box G is pivoted the end of the connecting-bar H, the other end of which is pivoted to a lever, I. One end of the lever I is pivoted to one of the bars F, upon which the box G rests and slides. The other end of the lever I rests upon the other bar, F, upon which the other end of the box rests and slides, and to it is connected, by a link or other suitable coupling, J, the upper part of the upright lever K. The lever K is pivoted to the frame A, and its lower end projects downward at the side of the wheel C, so as to be struck by the pins L, attached to the said wheel C.

Several holes are formed in the frame A and in the lever K to receive the pivoting-bolt, so that the said lever may be adjusted to correspond with the adjustment of the other parts of the machine.

To the upper end of the lever K is attached the end of the spring M, the other end of which is attached to the forward part of the frame A.

By this construction, as the machine is moved forward, the pins L, striking against the lower end of the lever K, agitate the box G, so that the poison will be sifted out upon the plants, the lever K being brought back to its former position after the passage of each pin L by the spring M.

To the forward part of the frames A is attached a tank, N, which may be made in the form of a cylinder, as shown in Figs. 1 and 2, or in any other convenient form.

From the cylinder N a small pipe, O, leads to a cross-pipe, P, in the lower forward side of which are formed a number of holes, as shown in Fig. 2. The connecting-pipe O is provided with a valve, Q, to enable the flow of water through it to the sprinkling-pipe to be regulated or stopped, as required.

With this construction, by opening the valve Q as the machine is moved forward, the plants will be sprinkled with water, so that the poison will adhere to them, and thus be effective in destroying the bugs.

When the machine is used early in the morning, when the plants are wet with dew, or after a rain, the sprinkling attachment will not be required, but it should be used when the plants are dry.

I am aware that it is not broadly new in a poison-distributer to employ a front sprinkler and a rear powdering device, so that the first will dampen the plants and the second sprinkle powder over them.

Having thus described my invention, I claim as new and desire to secure by Letters Patent—

The combination of the bars F, the screen-box G, the connecting-rod H, the two pivoted levers I K, the pins L, and the spring M with the frame-work A B and the wheels C, substantially as herein shown and described.

JAMES GOODHEART.

Witnesses:
JAMES T. GRAHAM,
C. SEDGWICK.